United States Patent
Kimpe

(10) Patent No.: US 10,212,312 B2
(45) Date of Patent: Feb. 19, 2019

(54) IMAGE COLOUR CALIBRATION WITH MULTIPLE COLOUR SCALES

(71) Applicant: BARCO NV, Kortrijk (BE)

(72) Inventor: Tom Kimpe, Landegem (BE)

(73) Assignee: BARCO NV, Kortrijk (BE)

( * ) Notice: Subject to any disclaimer, the term of this patent is extended or adjusted under 35 U.S.C. 154(b) by 37 days.

(21) Appl. No.: 15/326,298

(22) PCT Filed: Jul. 10, 2015

(86) PCT No.: PCT/EP2015/065896
§ 371 (c)(1),
(2) Date: Jan. 13, 2017

(87) PCT Pub. No.: WO2016/008825
PCT Pub. Date: Jan. 21, 2016

(65) Prior Publication Data
US 2018/0027148 A1    Jan. 25, 2018

(30) Foreign Application Priority Data
Jul. 16, 2014    (GB) .................................. 1412620.5

(51) Int. Cl.
*G06K 9/00*    (2006.01)
*G06K 9/40*    (2006.01)
(Continued)

(52) U.S. Cl.
CPC .............. *H04N 1/60* (2013.01); *G06T 11/001* (2013.01); *G09G 5/02* (2013.01);
(Continued)

(58) Field of Classification Search
USPC ....... 382/167, 274; 345/591, 88; 348/E9.037
See application file for complete search history.

(56) References Cited

U.S. PATENT DOCUMENTS 9,685,109 B2 * 6/2017  Kimpe ................ G09G 3/3208
9,799,305 B2 * 10/2017 Nasiriavanaki ........ G09G 5/026
(Continued)

FOREIGN PATENT DOCUMENTS

| EP | 2620885 A2 | 7/2013 |
|---|---|---|
| WO | 2011/046807 A2 | 4/2011 |
| WO | 2013/086169 A1 | 6/2013 |

OTHER PUBLICATIONS

Liu et al, "COlor alibration for a Surrounding True-ClOlor LED despaly System by PWM COntrols" Nov. 2014,, IEEE COI 61, No. 11, pp. 6244-6252.*
(Continued)

*Primary Examiner* — Kathleen Y Dulaney
(74) *Attorney, Agent, or Firm* — Bacon & Thomas, PLLC

(57) ABSTRACT

Methods of image calibration and in particular of image calibration having a multiple of color scales as well as to quantitative imaging such as quantitative medical imaging, or to a display device or to a system for displaying an image, or to a controller of a display, or to software to enable the image calibration, or to a visualization application and a display. The method for processing an image, includes the steps of: —selecting at least one trajectory in a color space; —defining a transformation which primarily increases perceptual linearity of consecutive points belonging to the at least one trajectory; —applying the transformation to the image. This has the advantage that the perceptual linearity can be restricted to the trajectory.

28 Claims, 10 Drawing Sheets

(51) Int. Cl.
G09G 5/02 (2006.01)
G09G 3/36 (2006.01)
H04N 1/60 (2006.01)
G06T 11/00 (2006.01)

(52) U.S. Cl.
CPC ............ G06T 2207/30004 (2013.01); G09G 2320/0693 (2013.01); G09G 2340/06 (2013.01); G09G 2380/08 (2013.01)

(56) References Cited

U.S. PATENT DOCUMENTS

| | | | | |
|---|---|---|---|---|
| 2004/0021672 | A1* | 2/2004 | Wada | G09G 3/002 345/591 |
| 2010/0026702 | A1* | 2/2010 | Herbert | G09G 5/02 345/589 |
| 2010/0277492 | A1* | 11/2010 | Frederick | G09G 3/2003 345/589 |
| 2012/0075374 | A1 | 3/2012 | Szafraniec | |
| 2013/0187958 | A1* | 7/2013 | Kimpe | G09G 3/3406 345/690 |
| 2013/0287313 | A1* | 10/2013 | Marchessoux | G09G 5/10 382/274 |
| 2014/0139541 | A1* | 5/2014 | Willaert | G09G 5/02 345/589 |
| 2014/0143299 | A1* | 5/2014 | Klotzer | G06F 19/321 709/203 |
| 2015/0278442 | A1* | 10/2015 | Rezaee | G06F 19/321 382/128 |
| 2016/0086572 | A1* | 3/2016 | Nasiriavanaki | G09G 5/026 345/590 |

OTHER PUBLICATIONS

Lissner et al, "Toward a Unified COlor Space for Perception Based IMage Processing", Mar. 2012, IEEE vol. 21, No. 3, pp. 1153-1168.*

Naranjargal Dashdorj et al., "Effects of Subanesthetic dose of nitrous oxide on cerebral blood flow and metabolism," Anesthesiology, vol. 118, No. 3, pp. 577-586 (Mar. 1, 2013).

Ingmar Lissner and Philipp Urban, "Toward a Unified Colour Space for Perception-Based Image Processing," IEEE Transactions on Image Processing vol. 21 issue 3 (Mar. 2012).

International Search Report and Written Opinion for PCT/EP2015/065896 dated Oct. 30, 2015 (14 pages).

Levkowitzh H et al., "Color scales for image data," IEEE Computer Graphics and Applications, IEEE Service Center, NY, NY, vol. 12, No. 1, pp. 72-80 (Jan. 1, 1992).

Levkowitz H, "Perceptual steps along color scales," International Journal of Imaging Systems and Technology, pp. 97-101 (Jan. 1, 1996).

Moreland E. K., Bebis, G. et al., "Diverging Color Maps for Scientific Visualization," Advances in Visual Computing, pp. 92-103 (Nov. 30, 2009).

Thompson D. et al., "A provably-robust sampling method for generating colormaps of large data," 2013 IEEE Symposium on large-scale data analysis and visulation, IEEE, pp. 77-84 (Oct. 13, 2013).

Mittelstadt S. et al., "Revisiting perceptually optimized color mapping for high-dimensional data analysis," Eurovis 2014 (Jun. 9, 2014).

Hemminger B.M. et al., "Are medical image display systems perceptually optimal?," Medical Imaging 1996—Physiology and Function from Multidimensional Images, vol. 2707-58 (Feb. 1, 1996).

Second Written Opinion for PCT/EP2015/065896 dated Jun. 3, 2016 (8 pages).

International Preliminary Report on Patentability for PCT/EP2015/065896 dated Oct. 14, 2016 (27 pages).

British Search Report for GB1412620.5 dated Jan. 20, 2015 (4 pages).

Furukawa et al., "Representation method for monochrome images on display monitor based on luminance linearization," Bulletin of Hiroshima Institute of Technology Research, vol. 42, pp. 227-236 (2008).

Furukawa et al., "Required quantizing resolution for perceptually linearized medical X-Ray images on display monitor," Transactions of the Institute of Electronics, Information and Communication Engineers D-II, vol. J85D-II, pp. 351-360 (2002).

Reference/calibration slide for digital pathology (FFEI limited, FFEI proposal for calibration assessment slide; ICC MIWG, Calibration Slide for Histopathology task force; Teleconference 15:00 (UK)/10:00 (EST); http:www.color.org/groups/medical/Minutes_Jan_2014_Calibration-Slide-Histopath.pdf (Jan. 21, 2014 ).

* cited by examiner

Fig. 8b

- 1. Select at least one trajectory in a colour space
  - 1.1. Identify at least one colour scale that is likely used in images that will be shown on the display system
  - 1.2. Detemine which trajectory corresponds to that colour scale in a colour space
  - 1.3. Select that trajectory in that colour space
  - 1.4. Optional: select an additional trajectory in a colour space

Fig. 8c

- 1. Select at least one trajectory in a colour space
  - 1.1. Retrieve a calibration image
  - 1.2. Extract from that calibration image relevant features
  - 1.3. Determine the colour points of these relevant features
  - 1.4. Create a trajectory in a color space which contains these colour points
  - 1.5. Optional: select an additional trajectory in a colour space

Fig. 8d

| 1. Select at least one trajectory in a colour space |

| 1.1. Extract from an Image, areas or features that correspond to different levels of a quantitative value |

The quantitative value could correspond to eg.
- concentration of a molecule, tracer, or substance
- molecular activity
- stiffness, strength, ... or other characteristics of materials or tissue
- biomarker value
- ....

| 1.3. Determine the colour points of these areas |

| 1.4. Create a trajectory in a color space which contains these colour points in an order corresponding to increasing or decreasing level of the corresponding quantitative value |

| 1.5. Optional: select an additional trajectory in a colour space |

Fig. 8e

| 1. Select at least one trajectory in a colour space | 1.1. Retrieve a calibration image |

1.2. Extract from that calibration image areas or features that correspond to different levels of a quantitative value The quantitative value could correspond to eg.
- concentration of a molecule, tracer, or substance
- molecular activity
- stiffness, strength, ... or other characteristics of materials or tissue
- biomarker value
- ....

1.3. Determine the colourpoints of these areas 1.4. Create a trajectory in a color space which contains the colour points in an order corresponding to increasing or decreasing level of the quantitative value 1. 5. Optional: select an trajectory in a colour space PET image     CT image     Fused PET/CT image

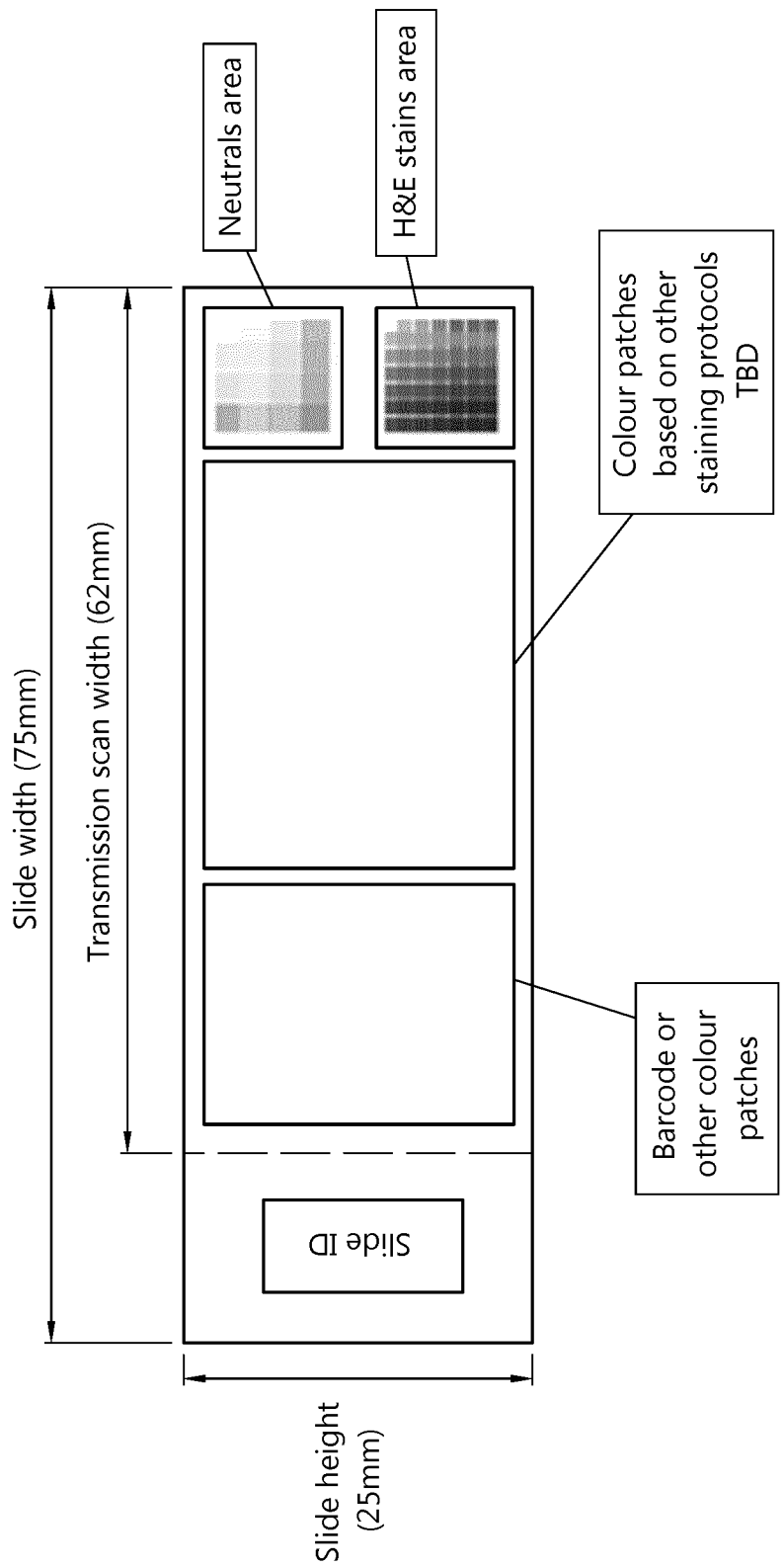

IMAGE COLOUR CALIBRATION WITH MULTIPLE COLOUR SCALES

The present invention relates to image calibration and in particular image calibration comprising a multiple of colour scales as well as to quantitative imaging such as quantitative medical imaging, or to a display device or system for displaying an image, or a controller of a display, or software to enable the image calibration, or a visualization application and a display.

BACKGROUND

Quantitative medical imaging is a fairly recent technology field in medical imaging. Quantitative imaging is the extraction of quantifiable features from medical images for the assessment of normal or the severity, degree of change, or status of a disease, injury, or chronic condition relative to normal. Quantitative imaging includes the development, standardization, and optimization of anatomical, functional, and molecular imaging acquisition protocols, data analyses, display methods, and reporting structures. These features permit the validation of accurately and precisely obtained image-derived metrics with anatomically and physiologically relevant parameters, including treatment response and outcome, and the use of such metrics in research and patient care.

The quantitative calculated values are typically visualized as colours, either as pseudo colours on top of other medical image, or as colour images on their own. Examples of such images are shown in FIGS. 1 to 4. FIG. 1 shows an image of PET SUV (Positron Emission Tomography Standardized Uptake Value) uptake values. Positron emission tomography (PET) is a nuclear medicine, functional imaging technique that produces a three-dimensional image of functional processes in the body. The system detects pairs of gamma rays emitted indirectly by a positron-emitting radionuclide (tracer), which is introduced into the body on a biologically active molecule. Three-dimensional images of tracer concentration within the body are then constructed by computer analysis. In modern PET-CT scanners, three dimensional imaging is often accomplished with the aid of a CT X-ray scan performed on the patient during the same session, in the same machine. If the biologically active molecule chosen for PET is fludeoxyglucose (FDG), an analogue of glucose, the concentrations of tracer imaged will indicate tissue metabolic activity by virtue of the regional glucose uptake. Use of this tracer to explore the possibility of cancer metastasis (i.e., spreading to other sites) is the most common type of PET scan in standard medical care (90% of current scans). However, on a minority basis, many other radioactive tracers are used in PET to image the tissue concentration of many other types of molecules of interest.

The colours are used to indicate specific calculated/measured numbers, and a scale is shown next to the image such that the radiologist can estimate the value from comparing the scale with the colours in the image. The dashed lines in the scale emphasize the different colours of the scale. There are, however, only two ranges where it is really possible to deduce the quantitative number from the colour image: around value 0.75 and around 1.75. For the other values there is hardly any visible difference in colour visible and therefore it is difficult to accurately deduce the quantitative value in a visual way.

FIG. 2 shows a calculation of Quantitative Dynamic Image Analysis for Contrast Enhanced MRI (Magnetic Resonance Imaging) and CT (Computed Tomography). Note the scale which is used to make it possible for the radiologist to deduce the quantitative value from the colour image. The dashed lines in the scale emphasize the different colours of the scale. Here, the blue and green parts of the scale are each larger than the red part of the scale. For the other values there is hardly any visible difference in colour visible and therefore it is difficult to accurately deduce the quantitative value in a visual way. Further, this scale is not perceptually uniform but consists mostly out of green and blue. It would be better for human perception to equally spread out all colours over the scale, which would improve ability to visually estimate the quantitative value being visualized.

Two more examples are shown in FIGS. 3 and 4. Both images are ultrasound images with additional quantitative information being visualized on top of the ultrasound. In FIG. 4 it concerns an elastography ultrasound image. Please note the different colour scale/colour coding used herein. Also here the scale is perceptually not uniform. The dashed lines in the scale emphasize the different colours of the scale. The scale contains more blue and red than e.g. yellow or green.

Current state-of-the-art uses well known colour coding/colour mappings/colour lookup tables (LUTs) to translate quantitative numbers into colours. Examples of such LUTs are fire LUTs, rainbow LUTs, hot iron LUTs, Hot/heated/black-body radiation colour scale, . . . . These images then are typically stored in a particular colour space (CIE 1931 XYZ; CIELUV; CIELAB; CIEUVW; sRGB; Adobe RGB; ICC PCS; Adobe Wide Gamut RGB; YIQ, YUV, YDbDr; YPbPr, YCbCr; xvYCC; CMYK; raw RGB colour triplets; . . . ) and visualized on a display system. Sometimes (in an ideal situation) there is a colour management module (such as the ICC colour management module (CMM)) present that will take care of the appropriate transformation of the image in a particular colour space, to raw colour values (RGB; RGBW; . . . ) that can be visualized on a display system. In many cases though, the application that generates the image data is assuming that this data will be visualized on a display system with sRGB behaviour and therefore the colour data is just forwarded to the display system.

Most of the colour codings/colour mappings/colour LUTs that are frequently used to visualize quantitative imaging data, are not perceptually linear. This means that equal steps in the input data (the quantitative value being visualized) will be converted into colour values that are perceived as steps of different magnitude. This is a non-desirable situation since it makes it difficult to visually estimate from the image what exact value of quantitative is being visualized. This can be observed e.g. from FIG. 1, where it is clearly visible that the green part of the colour scale is dominant while in fact (in a perceptually linear situation) all colours should be perceptually equally spread over the scale such that the quantitative value being visualized can be equally easily visually estimated independent of the exact value of the quantitative data. Moreover, even if (in a rare situation) an appropriate colour mapping is used that maps quantitative imaging data onto perceptually linear colour values, even then in the current state-of-the-art typically one does not take into account the (non-linear) behaviour of the display system, resulting into a non-linear perception of the visualized colour values.

In current state-of-the-art, systems comprising a visualization application and a display are not optimized to visualize quantitative colour coded data. For example:

The state-of-the-art does not maximally make use of the capabilities of the display system The state-of-the-art does not take into account human perception and maximization of perceived contrast The state-of-the-art is perceptually not uniform, meaning that there are ranges in the scale where it is easier to deduce the values than for other ranges.

Papers have been published about display calibration methods that calibrate the display in such a way that it will behave as perceptually linear throughout its entire colour gamut, e.g. "*Toward a Unified Colour Space for Perception-Based Image Processing*", *Ingmar Lissner and Philipp Urban* (IEEE Transactions on Image Processing Volume 21 issue 3, March 2012).

In case of perceptually linear display systems, equal distances in the input signal will also result into equal perceptual distance (defined e.g. by deltaE76, deltaE94, deltaE2000, DICOM GSDF JND, JNDMetrix etc.) of the visualized output. So in theory, perfectly perceptually linear displays solve the problem of the non-optimal colour scales (under the condition that an appropriate perceptually linear colour scale is used). However in the state-of-the-art perceptual linearity of a display is achieved by restricting the addressable colour gamut, luminance and contrast of the display such that within these reduced display capabilities a perceptually linear behaviour can be achieved. In other words: existing perceptually linear colour displays require serious compromises in display luminance, display gamut and display contrast. In practice, the lower luminance/contrast/colour gamut makes these displays not useful for many applications.

Patent application EP2620885A2 discloses a method for improving medical images for human perception by selecting a region in the image to improve, and map all points within this region to a linearized scale. Thus EP2620885A2 selects a range of pixel values to be calibrated. Pixel values outside of this are typically clipped to minimum (black) or maximum (white) pixel value. As such image features that are represented by pixel values outside of the selected range will not be visualized anymore after the calibration of EP2620885A2 is applied. EP2620885A2 further explains that selection of the range can be done based on the specific part of the body that is of interest. E.g. EP2620885A2 describes that one could select a "blood vessel" preset (range) that will enhance visualization of blood vessels by selecting a range of pixel values that corresponds to "blood vessels" and mapping pixel values in this range to an optimized scale. However, when "blood vessels" is selected then it will be impossible to perceive image features that are outside of the selected range as these will all be mapped to a single pixel value. So for example, while the "blood vessel" range is selected, it will not be possible to perceive features of bone in the body (since blood vessels and bone typically consist of separated ranges of pixel values).

The deficiency with visualization of colour scales according to state-of-the-art can be illustrated by investigating a commonly used colour scale that ranges from red to yellow. A commonly used perceptually linearity metric is for example deltaE2000.

FIG. 5 shows a perceptual linearity of the "red to yellow" colour scale when visualized on a standard sRGB display, as well as on a DICOM GSDF calibrated display. It can be seen that throughout the entire scale, visualization on neither the sRGB nor the DICOM GSDF calibrated display leads to perceptually linear behaviour. This can be seen from the fact that the deltaE2000 steps are not constant but vary over the entire colour scale. Please note that this shows that despite the fact that a DICOM GSDF calibrated display was used (which means that the display was calibrated to have perceptually linear behaviour for greyscales), the colour behaviour of a commonly used colour scale still is highly perceptually non-linear.

If the display would be calibrated (with methods from prior-art) to be perfectly perceptually linear, then the deltaE2000 step would be constant throughout the entire scale, but there would be a significant loss of luminance, contrast and colour saturation of the display system. The reason why this loss occurs is due to the nature of aiming for perfect perceptually linear (e.g. deltaE2000) calibration: this comes down to trying to position an as large as possible cube inside the total gamut of the display (when visualized in the perceptually linear space). It would be like fitting a cube in the colour space in FIG. 6, and where the display behaviour is then limited to the area within the cube. This would lead to a huge loss in gamut, luminance and contrast.

SUMMARY OF THE INVENTION

It is an object of the present invention to provide alternative methods of image calibration and in particular of image calibration comprising a multiple of colour scales as well as of quantitative imaging such as quantitative medical imaging, or to provide a display device or system for displaying an image, or a controller of a display, or software to enable the image calibration, or a visualization application and a display.

Accordingly, the present invention provides a method for processing an image, comprising the steps of:

selecting at least one trajectory in a colour space defining a transformation which primarily increases perceptual linearity of consecutive points belonging to the at least one trajectory, and applying the transformation to the image.

This has the advantage that the perceptual linearity can be restricted to the trajectory, or mainly to the trajectory.

A "trajectory" is an ordered path within an existing colour space that is chosen, e.g. based on the image to study. In this way the linearization can be made to have less effect on the less interesting colour points so that the display performance (e.g. (peak) luminance) gets less affected.

While the transformation is applied to the image, points that do not belong to the selected trajectory or trajectories can be left unchanged. The calibration will not reduce or significantly reduce display luminance, contrast or colour gamut. Since it does not comprise all points in colour space, the calibration will not significantly reduce display luminance, contrast or colour gamut. Outside the trajectory or trajectories, the display can be left as natively calibrated or calibrated according to a conventional standard for medical imaging. Such standard could be for example sRGB, DICOM GSDF, . . . . In particular points that are not belonging to trajectories can be redistributed in order to reduce the discontinuities. Interpolation (linear, bilinear, cubic, bicubic, spline, . . . ) can be used to redistribute some of the points outside the trajectory. The redistributed points on the trajectories are fixed and in addition also some other points are fixed (e.g. points on the outer boundary of the colour gamut, or e.g. points belonging to primary or secondary colours, . . . ) and where the in-between points are generated by means of interpolation. This will result into a reduction of discontinuities since the interpolation also will create a smoothing/filtering effect.

A redistribution outside the trajectories could be done based on a mass spring system (where e.g. the redistributed points on trajectories are fixed, and where also points on the border of the colour space are fixed), or by means of a smoothing/filtering operation where points in the neighbourhood of points on trajectories are also slightly processed for linearity.

Quantitative imaging is the extraction of quantifiable features from medical images for the assessment of normal condition or severity, degree of change, or status of a disease, injury, or chronic condition relative to normal. Quantitative imaging includes any of the development, standardization, and optimization of anatomical, functional, and molecular imaging acquisition protocols, data analyses, display methods, and reporting structures. These features permit the validation of accurately and precisely obtained image-derived metrics with anatomically and physiologically relevant parameters, including treatment response and outcome, and the use of such metrics in research and patient care.

The at least one trajectory can contain points having different colour points. The colour space can be any suitable colour space such as one of sRGB, aRGB, raw RGB, Lab, ICC PCS.

The at least one trajectory may contain only points of a primary colour or a secondary colour. For example, the at least one trajectory can correspond to a colour scale.

The present invention in one aspect relates to a method for calibrating a display device for quantitative imaging, said display device having a colour gamut, the method comprising:
selecting at least one trajectory in a colour space,
defining a transformation which primarily increases perceptual linearity of consecutive points belonging to the at least one trajectory,
applying the transformation to the display device,
so that there are colour points of the display's colour gamut not in the trajectory but which are used to visualize a part of an image.

Colour points of the display's colour gamut not in the trajectory for example can. remain mostly unchanged or may be modified to a way different from the trajectory. so that colours that are less important (not used to visualize quantitative imaging data) remain mostly unchanged.

The method may include that at least one trajectory is selected in order to maximize the number of just noticeable differences along the trajectory. The at least one trajectory is piecewise linear in the colour space, or non-linear in the colour space.

The at least one trajectory may contain colours corresponding to different levels of a quantitative value. The colours may be ordered along the trajectory based on ascending or descending value of the quantitative value. The quantitative value may be related to (but not necessarily limited by) a concentration of a molecule, staining response, concentration of a tracer, concentration of a substance, concentration of a target molecule, molecular activity, metabolic activity, stiffness of a material, strength of a material, characteristics of a material, a biomarker value, etc. The selection of the trajectory can be done based on a reference image or calibration image.

The at least one trajectory can be selected for each image individually. This provides the advantage that each image can be treated in an optimal way. For example, the at least one trajectory can be selected based on the type of image or characteristics of an image.

This allows an optimisation with respect to types of images. For example, the image can be a digital pathology images and at least one trajectory is selected based on the particular stain that is used in the digital pathology image or the specific subspecialty of the digital pathology image. For example, the at least one trajectory can be selected based on the characteristics or type of typical images that will be shown on a display system. For example, the image can be a digital pathology image and the at least one trajectory is based on colour values that correspond to staining response for different concentrations of an antigen or the image can be a medical image and the at least one trajectory is based on colour values that correspond to different gradations of response to a contrast medium or a tracer.

The perceptual linearity can be quantified, for example by one of CIE76, CIE94, CIEdeltaE2000, DICOM GSDF.

The method can be extended so that instead of one trajectory, at least two different trajectories are selected. For example, at least two different perceptual linearity metrics can be used corresponding to the at least two selected trajectories. However in accordance with embodiments of the present invention even if there are more than one or more than two different trajectories there are always some parts of the colour gamut that lie outside these trajectories.

As an example, one selected trajectory can correspond to a neutral grey scale and wherein perceptual linearity for the neutral grey scale is evaluated by means of DICOM GSDF.

As a further optimisation, the transformation can take into account characteristics of the display system.

To provide a good performance, the defined transformation can preserve respectively at least 95%, at least 90%, at least 80%, at least 70% of colour gamut and/or luminance and/or contrast.

The method can have various implementations such as the transformation being applied by any of, or any combination of a CPU, a GPU, a DSP, an FPGA or an ASIC, or equivalent. To provide increased adaption to specific applications, the transformation can be partially applied on a CPU and partially applied on a GPU or an FPGA. The transformation can leave points not part of the trajectory with their native display calibration or calibrated according to a conventional standard for medical imaging. Such standard could be for example sRGB, DICOM GSDF, . . . . Thus points are not forced to be at extremes such as black or white. To provide a smooth transition the transformation can adapt points not part of the trajectory such that an increased continuous behaviour is obtained. To allow an easy and economical implementation the transformation can adapt points not part of the trajectory such that they comply with another standard such as gamma or sRGB.

To provide a good quality the at least one selected colour scale can be a colour scale that maximizes the calculated number of Just Noticeable Differences when this is calculated for a set of colour scales along the same trajectory.

The at least one selected trajectory can have a higher dimensionality. For example, each dimension of the trajectory can correspond to a different quantitative value. Each dimension of the trajectory can correspond to a concentration of a different tracer, or a staining response, or a concentration of a different molecule, or a concentration of a different anti-gen, or a concentration of a different antibody, for example.

An aim of an embodiment or embodiments of the present invention to let the perceptual distance such as deltaE2000 value be constant throughout the entire scale for the selected scale. Outside of the selected scales the perceptual distance such as deltaE2000 value could vary similarly to the native behaviour of the display, which often resembles sRGB or can be calibrated according to a different conventional standard for medical imaging. Such standard could be for example DICOM GSDF, . . . . In other words: according to embodiments of the present invention, colours belonging to one or more selected colour scales would be perceptually linearized, while colours outside of the selected colour scales would be primarily left unchanged. This combines best of both worlds: for the colours that are being used to visualize important information (e.g. quantitative imaging data) there would be the desired perceptually linear behaviour, while at the same time the gamut, luminance and contrast of the displays is mostly preserved since colours that are less important (not used to visualize quantitative imaging data) remain mostly unchanged.

Advantages of a visualization application and/or a display for visualization of quantitative colour coded data, are one, some or all of:

improved use of the capabilities of the display system taking into account human perception and improvement of perceived contrast at least parts of the image are perceptually uniform, meaning that there are less or no ranges in the scale where it is easier to deduce the values than for other ranges, less restriction on the addressable colour gamut, luminance and contrast of the display such that there is less loss of display capabilities while maintaining a perceptually linear behaviour less loss of display luminance, display gamut and/or display contrast image features that are represented by pixel values outside of a selected range will still be visualized after the calibration, e.g. outside the trajectory or trajectories, the display can be left as natively calibrated or calibrated according to a conventional standard for medical imaging. Such standard could be for example sRGB, DICOM GSDF, . . . .

a large number of points are not forced to be at extremes such as black or white.

The present invention also provides a system as described below. The present invention also provides software which when executed on a suitable processing engine executes any of the method embodiments of the present invention as described below. The present invention provides a display device for displaying an image, or a controller of a display, or software to enable the image calibration, or a visualization application and a display. The present invention also provides an image displayed on a display device.

BRIEF DESCRIPTION OF DRAWINGS

FIGS. 8*a* to 8*e* (algorithm) show more detailed implementations of step 1 of the method of an embodiment of the present invention.

FIG. 12 shows an example of a reference/calibration slide for digital pathology (FFEI limited, FFEI proposal for calibration assessment slide; ICC MIWG, Calibration Slide for Histopathology task force; Teleconference 21 Jan. 2014 15:00 (UK)/10:00 (EST); http:www.color.org/groups/medical/Minutes_Jan_2014_Calibration-Slide-Histopath.pdf).

DETAILED DESCRIPTION OF THE INVENTION

The present invention will be described with respect to particular embodiments and with reference to certain drawings but the invention is not limited thereto but only by the claims. Embodiments of the present invention find useful application in imaging techniques, e.g. quantitative imaging.

Figure 1:
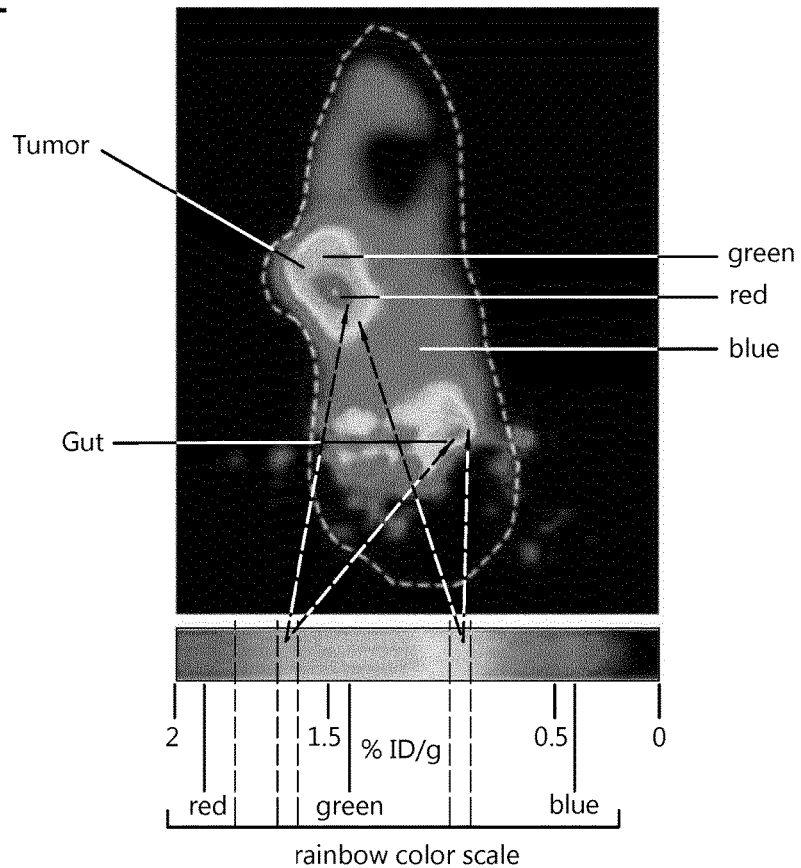
FIG. 1 shows an example of conventional quantitative imaging.
Figure 2:
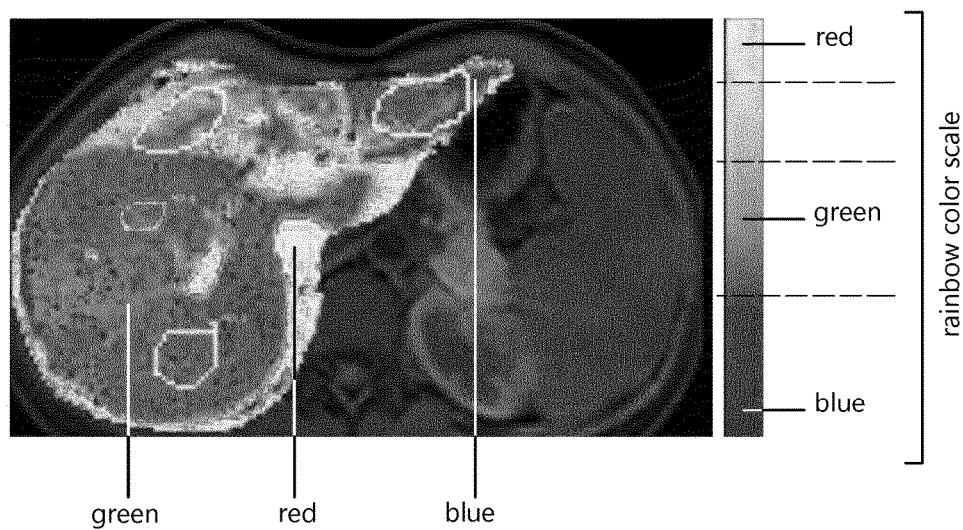
FIG. 2 shows an example of conventional quantitative imaging.
Figure 3:
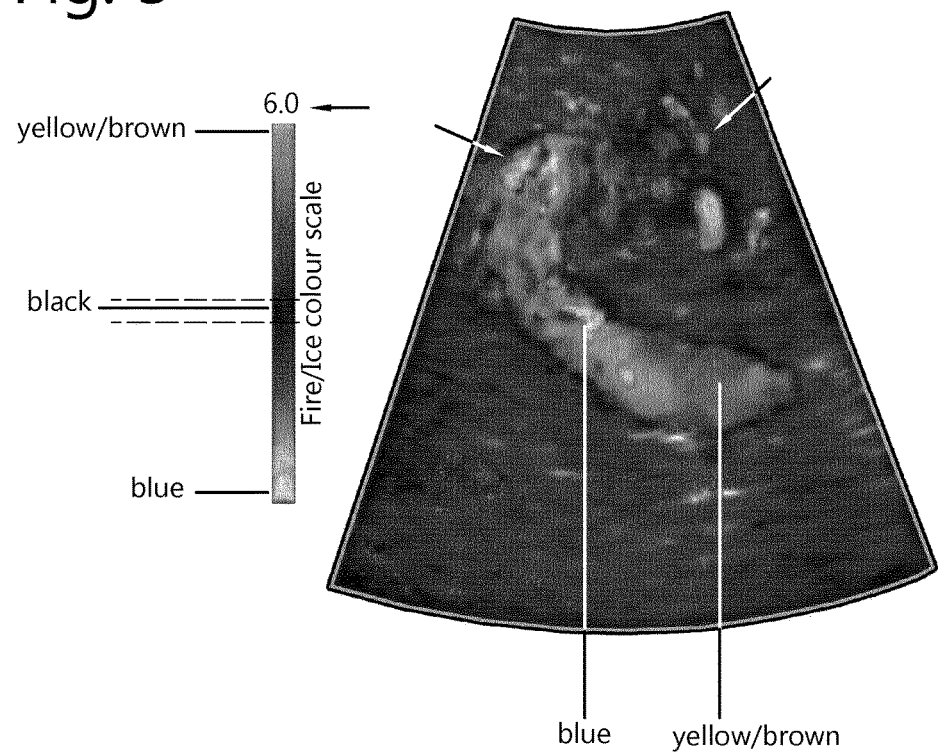
FIG. 3 shows an example of conventional quantitative imaging.
Figure 4:
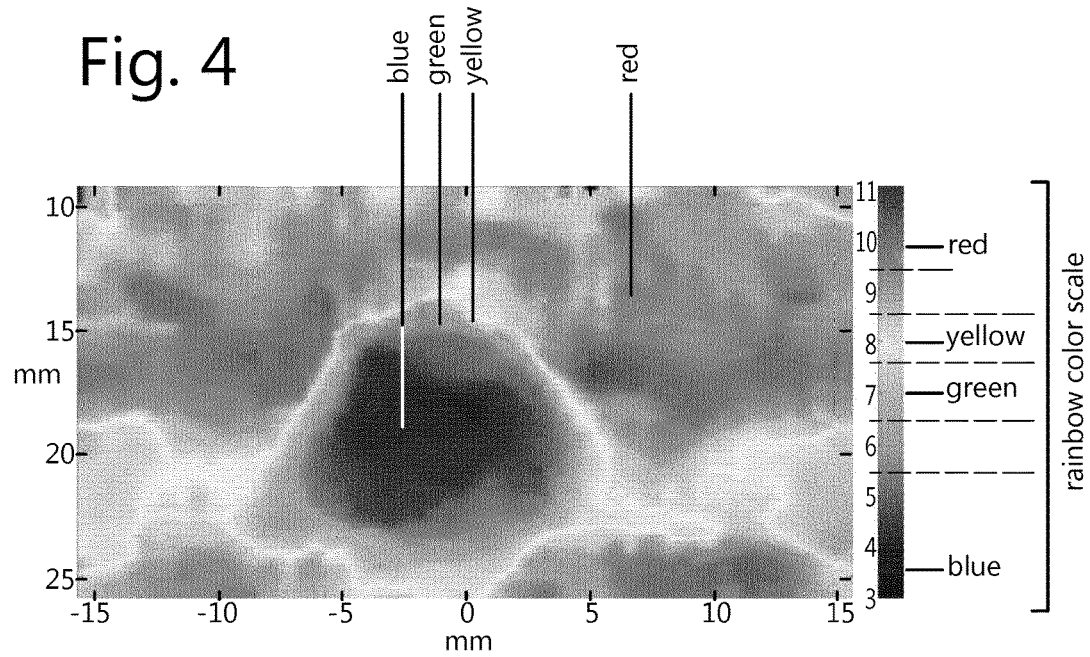
FIG. 4 shows an example of conventional quantitative imaging.
Figure 5:
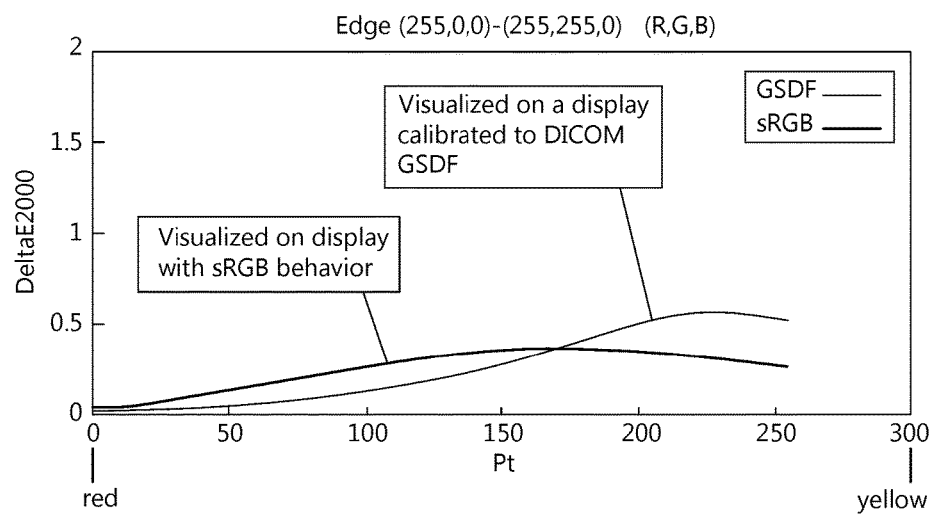
FIG. 5 shows an example of how conventional display calibration to sRGB and DICOM GSDF is not perceptually linear.
Figure 6:
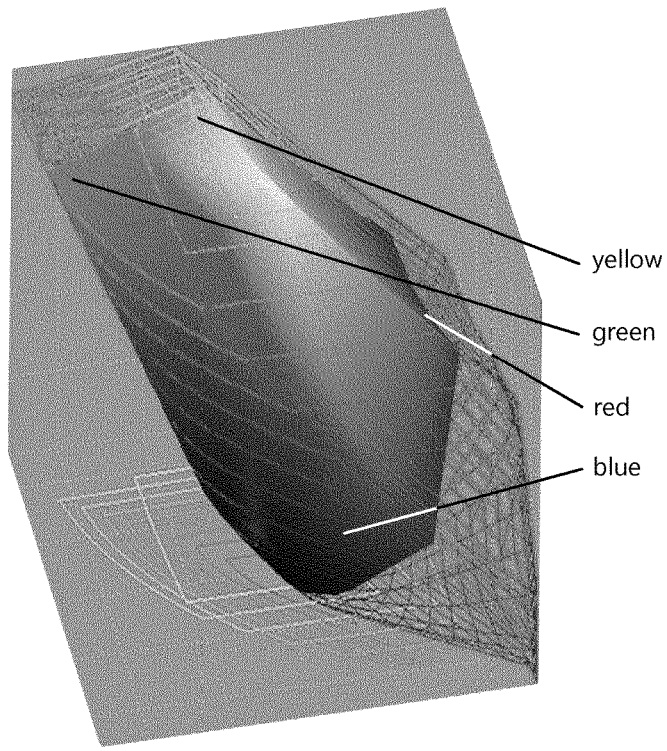
FIG. 6 illustrates how a conventional calibration will reduce the colour gamut.
Figure 7:
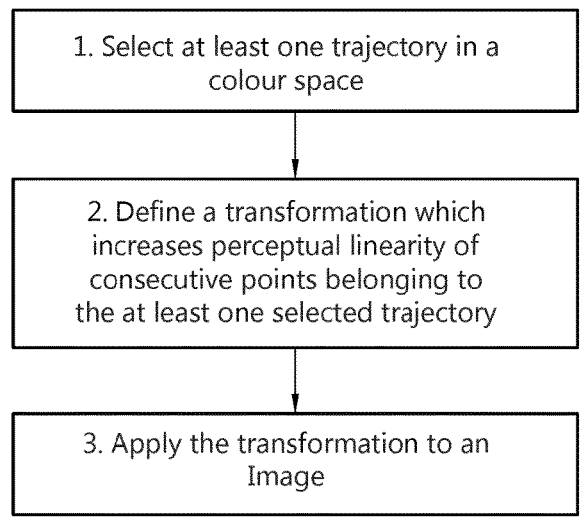
FIG. 7 shows a flow chart with the different steps of a method perceptual distance of an embodiment of the present invention.

FIG. 7 shows a flow chart with the different steps of an embodiment of the present invention. As a first step, one or more trajectories in a colour space are selected. The colour space can be e.g. (but not limited to) CIE 1931 XYZ; CIELUV; CIELAB; CIEUVW; sRGB; Adobe RGB; ICC PCS; Adobe Wide Gamut RGB; YIQ, YUV, YDbDr; YPbPr, YCbCr; xvYCC; CMYK; raw RGB colour triplets; . . . . The trajectory is a path through the colour space. This trajectory can be a continuous path or a discontinuous path, a linear path, a piece-wise linear path or a non-linear path, a multi-dimensional path, a continuous multidimensional path or a piece-wise multidimensional path. In any or some or all of the embodiments of the present invention a "trajectory" is an ordered path within an existing colour space. It can be chosen based on the image to study. In this way the linearization can be adapted to the technical requirements of the image and the information that it is to convey will be present in a better way. For example, the linearization can be arranged to have a lesser effect on less interesting colour points so that the display performance (e.g. (peak) luminance) is less affected.

Figure 9:
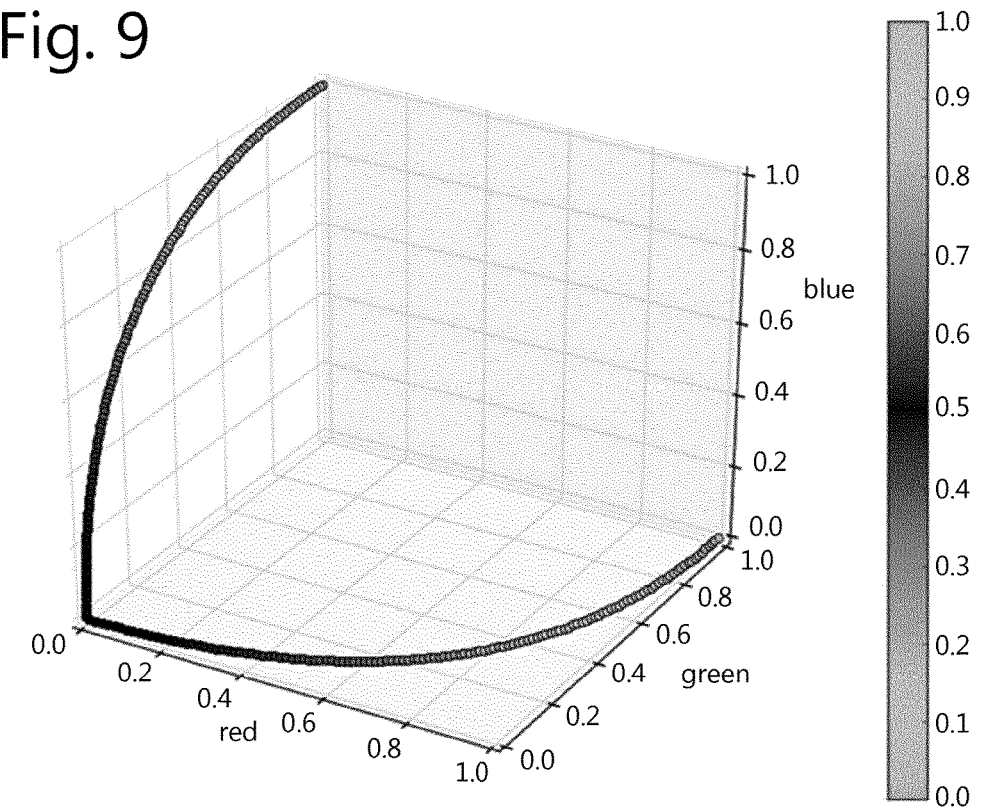
FIG. 9 shows an example of a colour scale and corresponding trajectory for use in embodiments of the present invention.

One example of a trajectory is shown in FIG. 9. In this case the colour space is RGB image space, and the trajectory is a curved line going from cyan to black to yellow. The trajectory can be continuous or discontinuous. The trajectory can be one-dimensional (e.g. but not limited to a straight or curved line through the colour space) or it can be higher dimensional. In the case of higher dimensional trajectories the trajectory can be of a maximum dimension which equals the dimensionality of the colour space. For example: in case of a three dimensional colour space (e.g. sRGB) the trajectory could be a two dimensional object (e.g. but not limited to: a plane in the colour space, a number of connected planes in the colour space, a curved surface in the colour space, . . . ), or it could be a three dimensional object (e.g. but not limited to: a cube, a rectangular prism, a triangular prism, Triangular Pyramid or Tetrahedron, a square pyramid, a cylinder, a cone, a sphere, a 3D object with curved boundaries . . . ). The trajectory has an order associated with it, meaning that e.g. in the example of a one dimensional line in a colour space this line has a beginning and an ending point and for each point it is possible to determine whether one point precedes the other point (or the reverse). In other words: all points belonging to the trajectory are ordered. In the example of a higher dimensional trajectory, this ordering of points belonging to the trajectory can be done along different dimensions. For example: in the case of a two dimensional trajectory in a three dimensional colour space, the trajectory itself consists of two dimensions. Each of the points on the two dimensional trajectory can be identified by means of two coordinates corresponding to the two dimensions of the trajectory. In other words: each point on the two dimensional trajectory can be identified by two coordinates in an ordered coordinate system. As such, it is also possible to calculate a distance between two points on a trajectory. As explained before, multiple trajectories can be selected. These trajectories can have the same or different dimensionality, and the selected trajectories may be mutually exclusive (non-overlapping) or may overlap partially. Each trajectory may come with its own ordering, meaning that if two points (let's call them point 1 and point 2) belong to two different trajectories (let's call them a and b), then point 1 could precede point 2 for what concerns trajectory a, while point 2 could at the same time precede point 1 for what concerns trajectory b.

The colour scale for use as a trajectory can furthermore be selected based upon characteristics of the display system, such as for example prior-knowledge of the colour behaviour of the display system. For example: some display systems have more saturated colours in part of their colour gamut than in other parts of their colour gamut. E.g. for such a display the red and green primary colours may be more saturated than the blue primary colour. In such a case it may be beneficial to select colour scales that make use of the saturated red and green colours and avoid scales that use less saturated blue colours. The selection of the colour scale can be done in such a way that the total JNDs (Just Noticeable Differences)) along the entire trajectory is maximized. Thus, one may select colour scales that have the highest number of JNDs along their trajectory.

Calculating these JNDs and this selection process can be done by e.g. a brute force approach where the JND's along a lot of different trajectories are calculated and compared. Boundary conditions may be added in order to avoid random trajectories that are not suitable. The non-suitable characteristics could comprise that a random trajectory oscillates too much or does not follow a single direction in hue, but should not be limited hereto.

The second step of the method shown in FIG. 7 consists of defining a transformation which increases perceptual linearity of the points belonging to the selected trajectories. The defined transformation primarily increases perceptual linearity of the selected trajectories, while mostly leaving points that don't belong to selected trajectories unchanged. So although it is possible that for some points that do not belong to the selected trajectories perceptual linearity is also increased (as a side effect of the applied transformation), the degree of increase in perceptual linearity will or can be much higher for points belonging to selected trajectories than for points that do not belong to selected trajectories. It is also possible that the defined transformation will change points that don't belong to selected trajectories in such a way that these points correspond to a desired behaviour such as corresponding to sRGB, aRGB, gamma curve or other behaviour. As indicated before, the advantage of mostly increasing perceptual linearity of points belonging to selected trajectories (and not or less for points not belonging to the selected trajectories) is that the colour gamut/contrast/luminance of the image and/or the display can be mostly preserved. For example: by applying the method of FIG. 7 it is possible to preserve e.g. 100%, respectively 95%, respectively 90%, respectively 85%, respectively 80%, respectively 70% of colour gamut/contrast/luminance of the image and/or the display. It is also possible to preserve a different degree of e.g. luminance than a degree of colour gamut. E.g. it may be the case that 100% of luminance is preserved, while only 90% of colour gamut and 95% of contrast is preserved.

The exact transformation defined/applied is not a limitation of the current invention. There are multiple possible transformations that can be defined and that generate the desired behaviour described above all of which are embodiments of the present invention. One embodiment e.g. is to redistribute points on the at least one selected trajectory such that the perceptual distance (e.g. expressed in deltaE2000 units) becomes more equal. This can be implemented in a variety of ways, for example by mass-spring systems, triangulation techniques, exhaustive search/LUT creation, or any other method of convenience. The exact metric or metrics used to calculate perceptual linearity should not be seen as a limitation of the current invention. Examples could be DeltaE2000, distance in Lab space, colour JND distance, . . . or it could be a combination of two or more of such metrics (e.g. depending on the exact location in the display or image gamut).

One specific way of redistributing the points which is an embodiment of the present invention comprises first calculating the total number of perceptual distance steps e.g. deltaE2000 units available on the entire trajectory (by calculating the perceptual distance such as the deltaE2000 distance between each pair of consecutive points and adding up all these distances in order to obtain the total distance). Secondly what the distance needs to be between each pair of consecutive points will be calculated in order to obtain a perceptually linear behaviour (this would be done e.g. by dividing the total perceptual distance such as the deltaE2000 distance by "the number of points minus one" to be placed on the trajectory). Finally, one would then redistribute the points on the trajectory such that the perceptual distance such as the deltaE2000 distance between each pair of consecutive points becomes more equal, and ideally becomes perfectly equal. By performing this procedure, the trajectory/trajectories will behave much more perceptually linear while the points not on the trajectory, for example, will be left unchanged and therefore the colour gamut/luminance/contrast of the image and/or display will remain (mostly) unchanged. This way of working though creates discontinuities at the borders/edges of the trajectories since there is an abrupt change between points that are transformed and other points that are not transformed at all. Therefore, better ways can be implemented to avoid these discontinuities which are included as embodiments of the present invention. One such possible way, i.e. embodiment of the present invention is to use a mass spring system. In this case the points on the trajectories (that have been perceptually linearized) are fixed, and the points that do not belong to selected trajectories will be redistributed using a mass spring system in order to reduce/remove the discontinuities. Furthermore, in order to preserve the entire colour gamut/luminance/contrast of the image and/or display, the outside border of the gamut of the image and/or display can also be fixed when applying the mass spring system. By doing so the outside border of the image and/or display gamut will not change (and therefore colour gamut/luminance/contrast will not change), also the trajectories themselves are fixed such as to keep the increased perceptual linearity achieved by means of the redistribution, and the other points of the image and/or display gamut can be also redistributed by the mass spring system in order to obtain a more continuous behaviour.

Finally, the third step of the method shown in FIG. 7 comprises or consists of applying the defined transformation to a least one image. Note that in embodiments of the present invention the input colour space of the transformation may be the same or different than the output colour space of the transformation. Suitable transformations are embodiments of the present invention. For example: the transformation may take an sRGB image as input, while the output of the transformation may be raw RGB values that are directly to be sent to a display system. Alternatively, the transformation may take aRGB both as input and output colour space. Also note that in embodiments of the present invention the colour space in which the trajectories have been defined may or may not be the same as the input and/or output colour space of the transformation. E.g. the trajectories could be defined in Lab colour space, while the transformation may use sRGB as input and output colour space.

FIGS. 8a, 8b, 8c, 8d and 8e clarify specific embodiments of how the selection of the at least one trajectory may be done.

Figure 8A:
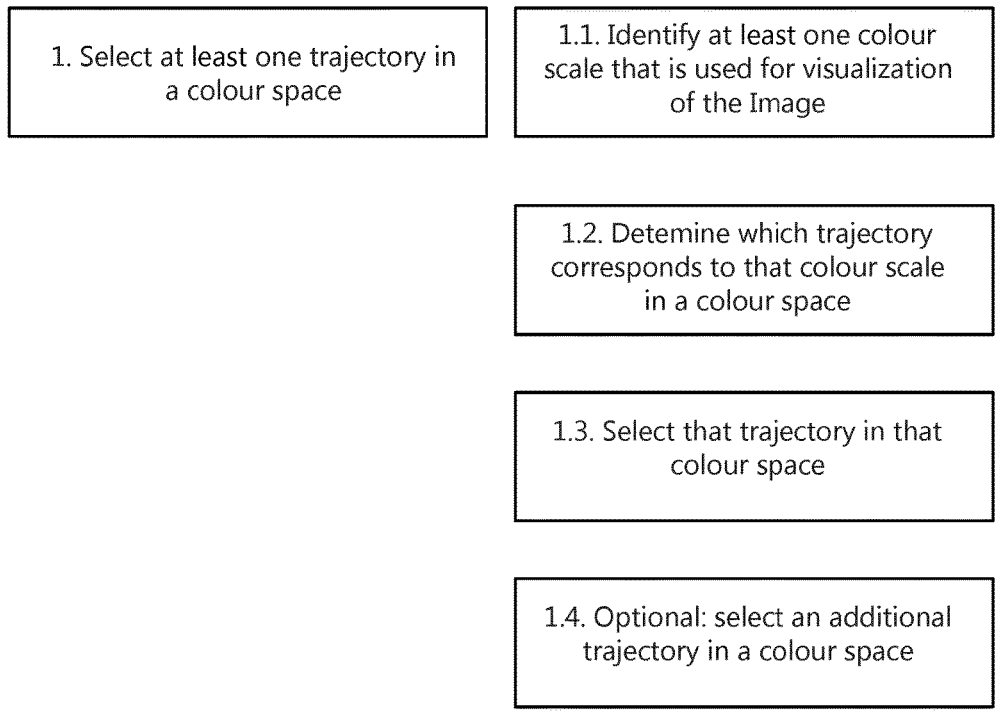

FIG. 8a uses a colour scale in order to select a trajectory. In step 1.1 at least one colour scale (e.g. but not limited to fire LUTs, rainbow LUTs, hot iron LUTs, Hot/heated/blackbody radiation colour scale, . . . ) is identified that is used in/for the image that needs to be visualized. This identification could be done e.g. by analysing/inspecting the image and detecting which colour scale(s) has/have been used to generate the image. Especially when the colour scale itself is part of the image (as is the case in FIGS. 1-4 where the scale is always shown next to the image) then embodiments of the present invention include automatically by means of image analysis detecting the presence of a colour scale and identifying which particular colour scale is used. Alternatively, as further embodiments it is possible in some situations to also detect by means of image processing which colour scale is used in an image even though the scale itself is not shown in the image. Methods e.g. based on histogram analysis allow for detecting which mapping was used to transform a quantitative data value into a colour value and are included as embodiments of the present invention.

Alternatively, the user may be requested to manually select the colour scale which was used in an image.

Alternatively, the present invention also extends to software and software applications which may run on any suitable processing engine. Such a software application may be queried by means of a suitable routine such as an API about the colour scale(s) that the software application used to render the image. This could be done e.g. by means of an application programming interface (API).

Alternatively, there may be information about the colour scale that was used to render the image in a header or metadata field of the image. E.g. some images come with extensive headers that contain additional information about the image (e.g. but not limited to DICOM headers, ICC profiles, . . . ), including e.g. how the image was rendered. This metadata or header information may also be provided per device (e.g. for each specific device that is generating images) rather than on a per image basis. Inspecting this header information or metadata information can reveal which colour scale(s) was/were used for rendering the image. Once the colour scale(s) has/have been selected, then for each selected colour scale a trajectory is generated (in a chosen colour space) that corresponds to the trajectory. As indicated before, the colour scales (and the corresponding trajectories) may be higher dimensional than a single dimension. An example of such a higher dimensional colour scale is a two dimensional colour scale where the first dimension modulates luminance while the second dimension modulates a colour point.

Figure 10:
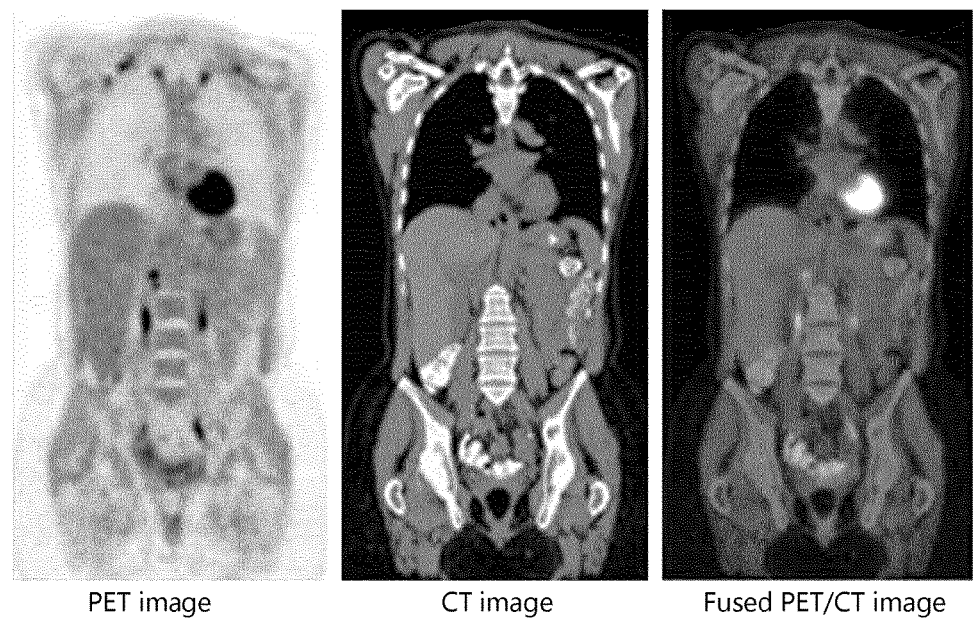
FIG. 10 shows an example of a colour PET/CT image.

Another example is given in FIG. 10. The right hand side of FIG. 10 shows a colour medical image (PET/CT fused image) which is created based on two separate images (PET image on the left, CT image in the middle). The right colour image is what is typically being visualized. This right PET/CT image of FIG. 10 uses a two-dimensional colour scale, where one dimension corresponds to the underlying CT image and where the other dimensional corresponds to the underlying PET image.

FIG. 8b describes another specific implementation to select one or more trajectories which is an embodiment of the present invention. In this case the selection will be based upon typical use of colour scales for particular images or particular displays. E.g. it is well known that specific images use specific colour scales. E.g. some applications (and thus types of images) may typically use a fire/ice colour scale, while other applications (and thus types of images) may typically use a rainbow colour scale. In such a situation, the system could determine/predict based on the type of image or the application the image is being used for, what colour scale is likely being used. This colour scale (or these colour scales) can then be selected. A similar principle can be used for display systems. It is well known that (especially in medical imaging) there are specialty display systems, meaning that some displays often are used only for one or a limited number of specialty applications (such as mammography, pathology, . . . ). In this case based on the application that the display is used for (and therefore the type of display) what colour scale or colour scales will likely be used can be determined/predicted. This colour scale (or these colour scales) then can be selected.

FIG. 8c describes another specific implementation to select one or more trajectories in accordance with another embodiment of the present invention. In many applications where image quality and/or image consistency is important, the systems are calibrated and/or reference or test images are taken which contain specific (often known) features.

An example is digital mammography, where periodically test images are taken to verify that the digital mammography detector is still working fine. These test images typically consist of imaging of a known phantom or target, such that the image can be compared with what it is expected to be. Another example is digital pathology, where periodically "reference slides" with known patterns are being scanned. An example of such a reference slide is shown in FIG. 12. The reference slide shown in FIG. 12 consists of a number of areas or features. Most relevant are the "neutrals area" ('6 strips combine to produce 15 different neutral density areas') on the right and the "H&E stains area" ('6 Haematoxylin and 6 Eosin strips combine to produce an array of 48 different H&E stain combinations') on the right. This "H&E stains area" corresponds to the two dimensional colour scale which is relevant for the digital pathology image. So from observing the colours in the "H&E stains area" one can directly create the relevant two dimensional colour scale for this image. This H&E stains area occupies a substantial area of the pathology slide. Therefore an optimization could be to limit the number of patches in the H&E stain area. Based on this limited number of patches one could extrapolate the colour value of the omitted patches, the entire relevant colour scale and the trajectory. In the extreme case one could only include one single reference patch for Hematoxylin and one single patch for Eosin and use that as basis for generating the colour scale and trajectory. This generation of colours of omitted patches (and therefore generation of colour scale and trajectory) could be done by taking into account known information about the colour behaviour of different concentrations of H&E. So in other words: if one knows (based on e.g. but not limited to theoretical knowledge or based on previously measured data or previously measured slides or stain areas) how the colour of H&E behaves in function of concentration, then one or a limited number of measured colour points corresponding thereto can be sufficient to generate the entire curve of colour point in function of concentration.

Although the example above mentioned specific H&E stain, it is clear that other stains could be used in the stains area as well, and that the stains area could include a different number of stains (e.g. but not limited to one, two, three, four, . . . ) as well.

Please note that the "calibration or reference image" may be a separate image (as is the case in FIG. 12), or it may be an area which is part of the actual image that needs to be visualized. In case of a separate image, the calibration or reference image may be stored such that it can be re-used for a period of time. E.g. one could take a calibration/reference image only once per day. In this case step 1.1 of FIG. 8c may correspond to retrieving the reference image from storage. Alternatively, if no reference/calibration image is available yet, or if the reference/calibration image which is stored is too old, then step 1.1 may correspond to actually taking/creating a new reference/calibration image. A single reference/calibration image may contain only one or multiple features. These features do not necessarily need to directly correspond to the colour scales. It is very well possible that the relevant feature(s) need to be further processed in order to deduce the underlying colour scale(s). In that case, step 1.3. of FIG. 8c could be replaced by "determine the relevant colour scale(s) on the basis of the identified relevant features". Please also note that step 1.4. of FIG. 8c may involve interpolation. Indeed, often it is not practical to include all possible colour gradations of a colour scale in a reference/calibration image. Therefore one may decide only to include a subset of colour gradations of a colour scale. The missing colour gradations then can be generated e.g. by interpolation techniques such that the entire colour scale can be generated.

FIG. 8d describes yet another specific implementation to select one or more trajectories which is an embodiment of the present invention. In this case relevant areas or features that correspond to different levels of a quantitative value are extracted from an image. This may be done in any of the embodiments of the present invention. In case of a digital pathology image these quantitative values could correspond to e.g. concentrations of a particular molecule, tracer, antibody, anti-gen, or substance. In a PET or SPECT image the quantitative values could correspond to e.g. molecular activity or concentrations of a tracer or target. In quantitative imaging in general, the quantitative values could correspond to (calculated or measured) biomarker values. In imaging in general the quantitative values could correspond to stiffness, strength, transmission, absorption, temperature, humidity, . . . or other characteristics of a material, tissue or substance. Once the areas/features that correspond to different levels of a quantitative value have been identified, then the colour points of these areas/features are observed. On the basis of these colour points a trajectory is created that contains these colour points in an order corresponding to decreasing or increasing level of the corresponding quantitative value. Please note that it is possible that one image visualizes multiple quantitative values (or in other words: that one image visualizes higher-dimensional quantitative values). In that case, the trajectory that is being created will also be higher dimensional. As explained before, if only a limited number of levels of the quantitative value are being identified, then interpolation can be used to generate the colour points of the in between quantitative values.

Finally, FIG. 8e shows one last example of how one or more trajectories can be selected in accordance with an embodiment of the present invention. FIG. 8e is a variant/combination of FIGS. 8c and 8d. In this case, the features/areas corresponding to the different levels of quantitative values are not extracted from the image itself, but rather from a reference or calibration image. Also here, the reference or calibration image may be stored and retrieved for later use, or may be taken/created again for each individual image. The reference/calibration image also in this case may be a part of the image itself.

Examples and Embodiments of an Implementation

Here follow examples of an implementation of an embodiment of the present invention.

A first example follows the specific method described in FIG. 8a or FIG. 8b. Suppose that the colour scale shown in FIG. 11a has been identified as being used for the visualization of an image. According to step 1.2. (of FIGS. 8a and 8b) then the trajectory needs to be identified that corresponds to this colour scale. This can be done by inspecting the colour values that correspond to the different gradations of the colour scale. These colour values have been shown in the bottom part of FIG. 11a. These colour values are visualized in a raw RGB value colour space. As can be seen these values go from cyan, over black to yellow. By inspecting the colour scale itself it can be clearly seen that the order of the values indeed is to start with cyan, over blue, to black, to red, to finally yellow. So the trajectory corresponding with the colour scale is piece-wise linear and contains the colour values going from cyan, to blue, to black, to red, to yellow. This trajectory then is selected.

Figure 11A:
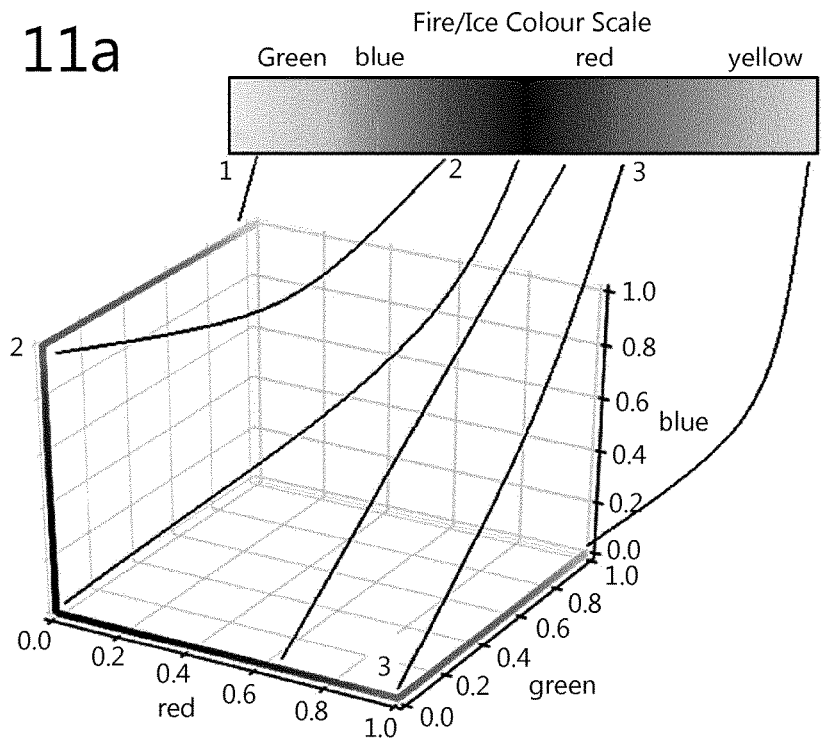
FIGS. 11*a* and 11*b* show a specific example on a fire/ice colour scale

Please note that if this colour scale would be visualized by means of the state of the art then the colour scale would look like in FIG. 11a. Please note that the scale is perceptually not linear. This can be seen e.g. from the fact that although the distance in input data from point 1 to point 2 is only one fourth of the entire scale, in the perceived scale it almost takes half of the perceived scale. Also it can clearly be seen that it is almost impossible to visually the different shades of "cyan" and "yellow", which also indicates that the colour scale is perceptually not linear.

Figure 11B:
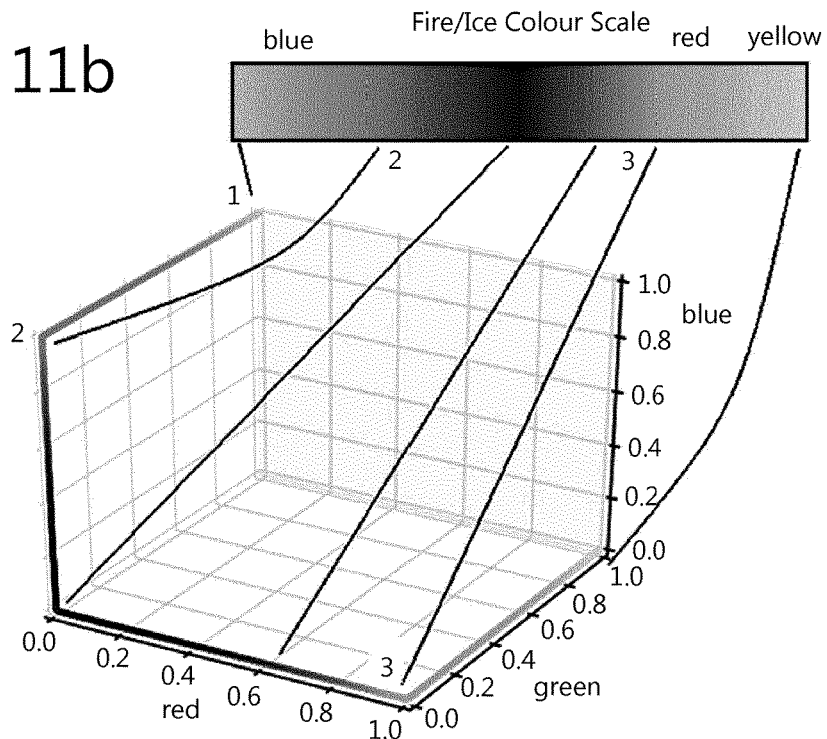

According to step 2 of FIG. 7, a transformation will then be defined in order to increase perceptual linearity of the consecutive points belonging to the selected colour scale. This is done as follows: for each consecutive pair of points on the selected trajectory, the deltaE2000 distance is calculated. All these distances are added up and the average distance between pairs of consecutive points of the trajectory is calculated. The to be defined transformation will redistribute the points on the trajectory such that each pair of consecutive points on the trajectory has equal deltaE2000 distance. Please note that due to limitations of bit depth (accuracy of the colour space, quantization errors, . . . ) and/or due to limitations of the display system (bit depth, quantization errors) it may be that perfect equidistance is not feasible and that small differences in deltaE2000 distance remain after redistribution while providing an increase in linearization. Thus in such a case the transformation is defined which increases e.g. primarily increases perceptual linearity of consecutive points belonging to the at least one trajectory. This transformation could take the form of a lookup table (LUT) or could be defined by means of a mathematical formula. The effect of the defined transformation is shown in FIG. 11b. As can be seen, points on the trajectory have been redistributed (please note the marked points 1, 2, 3). Comparison between FIGS. 11a and 11b makes clear that points on the trajectory that are equidistant in the RGB colour space now also are perceptually much more equally distributed. This can be seen eg. from the fact that point 2 now indeed approximately is visually located at 25% of the colour scale in FIG. 11b (after the transformation has been applied), while in FIG. 11a this point was perceptually too far already in the scale.

Finally, according to step 3 of FIG. 7, the defined transformation is applied to an image. This could be any image that makes use of the selected colour scale/trajectory. The transformation could be applied once to a single image, or the same transformation could be applied to a series or stack of images.

In this example, steps 1 and 2 of FIG. 7 could be executed for example on a CPU or DSP. Step 3 could be executed e.g. inside a GPU or inside a FPGA. But the exact location of execution is not a limitation of the present invention. Different steps could be executed at different locations in the image processing pipeline and on different types of devices. Also, the transformation itself could be split up in different phases where one step of the transformation is e.g. executed on a CPU inside a PC, while a next step is executed on a GPU inside a PC and yet another step is executed inside the display in an FPGA or ASIC. It is also possible that one or more steps are executed remotely e.g. over the internet or in a private or public cloud.

As a further improvement to the example above, the defined transformation could be extended such that in addition the behaviour of the display system that will be used to visualize the image is taken into account. This would mean that when the colour values that correspond to the selected colour scale are identified, furthermore it is taken into account that these particular colour values will be visualized in a particular way by the display system. In this example, the image may be forwarded to an aRGB display, so for each RGB colour value it can be calculated or measured what colour coordinate the display will visualize for this particular RGB colour value. It is this final value of the display visualized colour coordinate that will be used as starting point for the calculation of the perceptual distances that will eventually serve to define the redistribution of points. Please note that taking into account the display system could be done by means of assuming a certain display standard (sRGB, aRGB, . . . ) but it could also be done by effectively using the specific characteristics of the individual display (or display type) that will be used for visualization. So one may want to characterize the individual display (or display type) in order to accurately take into account the effect of the display system. It is possible that this characterization is done periodically or once, and that the result is stored into a profile such as an ICC profile. In that case it is possible to use the ICC profile information in order to take into account the effect of the display system.

In the following exemplary implementation, a medical display should be calibrated to improve quantitative imaging of PET SUV uptake values and quantitative dynamic contrast enhanced MRI. It is concluded that the rainbow colour scale is a relevant scale, typically used to visualize this type of colour information.

The trajectory can then be represented as a line within the image space (RGB space) or display space or the perceptually linear space. It can further be a piecewise linear trajectory within such space, or it can even be a continuous or discontinuous trajectory of any shape within such space. One example of a trajectory is shown in FIG. 9. In this case the colour space is RGB image space, and the trajectory is a curved line going from cyan to black to yellow.

The display is adapted such that the display behaviour becomes perceptually linear along the trajectory of one or more selected colour scales (or lines). Since this does not comprise all points in colour space, the calibration will not significantly reduce display luminance, contrast or colour gamut. Outside the trajectory or trajectories, the display can be left as natively calibrated, or it is calibrated according to a conventional standard for medical imaging. Such standard could be for example sRGB, DICOM GSDF.

Another exemplary implementation concerns digital pathology images. In pathology, specific stains are used in order to visualize or differentially identify microscopic structures. Hematoxylin and eosin stain (H&E stain or HE stain) is one of the principal stains in histology. It is the most widely used stain in medical diagnosis and is often the gold standard. Different microscopic structures react differently to Hematoxylin versus Eosin and this results into a range of visible colours after staining. As such, for a pathologist the perceived colours are an indirect way to understand how a microstructure reacts to Hematoxylin and eosin and on that basis make a diagnosis. Different degrees of reaction to Hematoxylin and Eosin respectively could be considered as a relevant quantitative imaging value. As such, an image which is stained with H&E can be considered as an imaging having a relevant two dimensional colour scale, where one dimension corresponds to response to Hematoxylin and the other dimension corresponds to response to eosin. Unfortunately, as of today there is a large amount of variability in staining protocols, resulting in significant variability in the colour of stained images. This is a problem for accurate diagnosis. Moreover, the current way of working in digital pathology is to acquire digital visible light images of stained slides and visualizing these digital images as they would naturally be perceived under an optical microscope. Sometimes colour management is applied to make sure that the visualized digital images closely resemble the images as they would be perceived by looking into an optical microscope. This way of working is not ideal at all since the visualized colours corresponding to different levels of reaction/concentration to Hematoxylin and eosin are not perceptually linear. According to an embodiment of the present invention this problem will be solved by means of the practical implementation described below.

The first step (according to FIG. 7) is to select at least one trajectory in a colour space. This can be done in a number of ways: as explained in FIG. 8b, it may be possible to analyse several similar images (e.g. of a given pathology subspecialty, of image that were stained in the same way, of image acquired on the same digital pathology scanner) in order to extract the two dimensional colour scale corresponding to H&E reaction/concentration. By then identifying which colour points correspond to this colour scale, the relevant trajectory can be created. Alternatively, as described in FIG. 8e it may be possible to make use of a reference or calibration image. One such possible image is shown in FIG. 12. In the right bottom side of FIG. 12 there is an "H&E stains area" which corresponds to 48 different H&E combinations (there are 49 combinations, but the combination no H and E does not make sense). These 48 combinations then can be considered to be a relevant subset of a two dimensional quantitative value (the quantitative value being (H, E)). For each of these 48 combinations one can retrieve the colour point corresponding to the (H, E) combination. And on the basis of these colour points, one can create a two dimensional trajectory (one dimension corresponding to "H" and the other dimension corresponding to "E") that contains the 48 colour points and where the points are ordered e.g. based on increasing level of H and increasing level of E response. Please note that the reference/calibration image could be taken periodically, stored and then each time reused for a defined period of time. Or the reference/calibration image could be by default part of any slide image that is being created. A digital pathology image could e.g. be stored in the form of a raw RGB image, or it could be stored as an image in a particular colour space accompanied with an ICC profile. The information inside the ICC profile could in that case be used to determine the colour points of the points belonging to selected trajectories. The trajectories themselves could be described in the same colour space that was used to encode the image, or on another colour space.

The second step (according to FIG. 7) is to define a transformation which increases perceptual linearity (e.g. primarily increase perceptional linearity) of consecutive points belonging to at least one trajectory. In the example of digital pathology, this means that we aim at increasing perceptual linearity of points belonging to the two dimensional trajectory (or equivalently increasing perceptual uniformity of the two dimensional trajectory), but without making the entire colour space perceptually linear since this would result into a too large decrease of colour gamut/contrast/luminance. This could be done e.g. by primarily (or only) redistributing the points belonging to the two dimensional trajectory. The redistribution will be done such that the perceptual distance between neighbouring points in the two dimensional trajectory becomes as equal as possible. As metric to calculate perceptual distance a good choice in this case is deltaE2000. Determining how the exact redistribution needs to be done can be based on a brute force approach (trying all possible combinations and selecting the one that results into best overall perceptual uniformity), by means of a mass spring system where the outer border of points of the trajectory is kept fixed, and the other points are redistributed by means of the mass spring system, or by means of other known techniques to uniformly distribute points on a surface or along a line. Please note that although it may be desired to use the same perceptual step size along the two dimensions of the two dimensional trajectory, this is strictly speaking not necessary. One may also decide to use a larger step size in one direction/dimension than in another direction/dimension.

There are several ways to avoid visual artefacts because of discontinuities between points that have been redistributed (points on the trajectories) and points that have not been altered. One possible way is to also (slightly) redistribute points that are not belonging to trajectories in order to reduce the discontinuities. This redistribution could be done based on a mass spring system (where e.g. the redistributed points on trajectories are fixed, and where also points on the border of the colour space are fixed), or by means of a smoothing/filtering operation where points in the neighbourhood of points on trajectories are also slightly processed. Yet another possibility is to use interpolation (linear, bilinear, cubic, bicubic, spline, . . . ) where e.g. the redistributed points on the trajectories are fixed and in addition also some other points are fixed (e.g. points on the outer boundary of the colour gamut, or e.g. points belonging to primary or secondary colours, . . . ) and where the in between points are generated by means of interpolation. This will result into a reduction of discontinuities since the interpolation also will create a smoothing/filtering effect.

The defined transformation could furthermore also take into account characteristics of the display system that will be used to visualize the image. In that case the transformation will need to take into account the specific way that the image will be visualized on the display system when calculating perceptual distances and when redistributing points in order to increase perceptual linearity of consecutive points belonging to trajectories. This taking into account of the characteristics of the display system could be achieved e.g. by making use of the ICC device profile of the display system.

Finally, the third step (according to FIG. 7) is to apply the defined transformation to one or more images. As described before, the transformation could be defined for each image individually, or the same transformation could be applied to multiple images having of the same type or having similar characteristics. The selection of the trajectory could e.g. be executed on a CPU inside a computer, the definition of the transform could e.g. be executed on a CPU inside a computer, and the applying of the transform on an image could e.g. be executed on a GPU or CPU inside a computer or alternatively on a FPGA or ASIC inside a display. Some or all steps described above could furthermore be executed remotely over the internet or in a private or public cloud infrastructure.

The configuration of the functionality could be done e.g. by means of a Lookup Table which could be located inside the display, in the GPU (Graphical Processing Unit), in the driver of the GPU, in the operating system, or within a framework such as ICC (International Color Consortium) framework. The details of the adaptation circuitry or the location of such functionality should not be seen as a limitation of the current invention.

The present invention also includes a system adapted to carry out any of the methods of the present invention. Such a system may include a network such as a local area network or a wide area network including a server which is adapted to serve images which have been processed on the server in accordance with any of the methods of the present invention and a display device able to receive and to display such processed images. Alternatively, images could be processed on a computer different from the server or on the display device in accordance with any of the methods of the present invention. Such a system may include a processing engine such as a microprocessor or an FPGA. The processing engine may include one or more central processors CPU or may include one or more GPU, or for example one or more DSP, one or more FPGA or one or more ASIC as well as an input and an output and memory. These processing engines may be stand alone, e.g. in a separate unit such as a controller having an input for image signals and an output of the modified images signals which have been processed in accordance with any of the embodiments of the present invention. These processing engines may alternatively be embedded e.g. in a display device, a server of a network, a computer card, etc. which has an input for image signals and an output of the modified images signals processed in accordance with any of the embodiments of the present invention.

All methods according to embodiments of the present invention and systems according to the present invention can be implemented on computer system that is specially adapted to implement methods of the present invention. The computer system can include a computer with a processor and memory and is adapted to provide processed images to a display. Any of the methods of the present invention can be based on the computer having means for processing and visualizing a images. Each such a method can be implemented on a computer by providing software that when run on the computer. An input device such can be provided for inputting images, either on-line of offline, e.g. a signal storage device may provide such images such as an optical disk (CD-ROM or DVD-ROM), or solid state memory or a streaming or storage means via a network link, e.g. via a LAN or WAN.

The computer can comprise a processor and a memory, which stores machine-readable instructions (e.g. software as described below) which, when executed by the processor causes the processor to perform the described methods. The computer may include a video display terminal, input means such as a keyboard, a graphic user interface indicating means such as a mouse.

The computer typically includes a Central Processing Unit ("CPU"), such as a conventional microprocessor of which a Pentium processor supplied by Intel Corp. USA is only an example, and a number of other units interconnected via bus system. The bus system may be any suitable bus system. The computer includes at least one memory. Memory may include any of a variety of data storage devices known to the skilled person such as random-access memory ("RAM"), read-only memory ("ROM"), and non-volatile read/write memory such as a hard disc or solid state memory as known to the skilled person. For example, the computer may further include random-access memory ("RAM"), read-only memory ("ROM"), as well as a display adapter for connecting the system bus to a video display terminal, and an optional input/output (I/O) adapter for connecting peripheral devices (e.g., disk and tape drives) to the system bus. The video display terminal can be the visual output of a computer, and can be any suitable display device such as an LCD-based or a gas plasma-based flat panel display. The computer further includes a user interface adapter for connecting a keyboard, mouse, and optional speaker.

The computer can also include a graphical user interface that resides within machine-readable media to direct the operation of the computer. Any suitable machine-readable media may retain the graphical user interface, such as a random access memory (RAM), a read-only memory (ROM), a magnetic diskette, magnetic tape, or optical disk (the last three being located in disk and tape drives). Any suitable operating system and associated graphical user interface (e.g., Microsoft Windows, Linux, Android) may direct CPU. In addition, computer includes a control program that resides within computer memory storage. Control program contains instructions that when executed on CPU allow the computer to carry out the operations described with respect to any of the methods of the present invention.

The present invention also includes software which when executed on a processing engine is adapted to carry out any of the methods of the present invention. The software may be stored as a computer program product on a suitable non-transitory signal storage medium such as an optical disk (CDROM or DVD ROM), magnetic disk, solid state memory such as a flash memory, Read Only Memory, etc.

The present invention provides a system or software adapted to process an image, and may include means for selecting at least one trajectory in a colour space. The system or software may further comprise means for defining a transformation which increases, e.g. primarily increases perceptual linearity of consecutive points belonging to the at least one trajectory. The system or software may also include means for applying the transformation to the image. The system or software may have means adapted to allow at least one trajectory to contain points having a different colour point. The system or software may have means adapted to allow the colour space to be one of sRGB, aRGB, raw RGB, Lab, ICC PCS. The system or software may have means adapted such that at least one trajectory contains only points of a primary colour or a secondary colour. The system or software may have means adapted to allow at least one trajectory to correspond to a colour scale. The system or software or means can be adapted to select at least one trajectory in order to increase or maximize the number of just noticeable differences along the trajectory. The system or software or means may be adapted to allow at least one trajectory to be piecewise linear in the colour space, or to be non-linear in the colour space. The system or software or means may be adapted to allow at least one trajectory to contain colours corresponding to different levels of a quantitative value. The colours can be ordered along the trajectory based on ascending or descending value of the quantitative value. The system or software or means may be adapted so that the quantitative value is one of concentration of a molecule, staining response, concentration of a tracer, concentration of a substance, concentration of a target molecule, molecular activity, metabolic activity, stiffness of a material, strength of a material, characteristics of a material, a biomarker value. The system or software or means may be adapted to select the trajectory based on a reference image or calibration image. The system or software or means may be adapted to allow selection of at least one trajectory for each image individually. The system or software or means may be adapted to select at least one trajectory based on the type of image or characteristics of an image. The system or software or means may be adapted to allow the image to be a digital pathology image and to select at least one trajectory based on the particular stain that is used in the digital pathology image or the specific subspecialty of the digital pathology image. The system or software or means may be adapted to select at least one trajectory based on the characteristics or type of typical images that will be shown on a display system. The system or software or means may be adapted so that the image is a digital pathology image and the at least one trajectory is based on colour values that correspond to staining response for different concentrations of an antigen. The system or software or means may be adapted to allow the image to be a medical image and at least one trajectory to be based on colour values that correspond to different gradations of response to a contrast medium or a tracer. The system or software or means may be adapted so that a perceptual linearity is quantified by one of CIE76, CIE94, CIEdeltaE2000, DICOM GSDF. The system or software or means may be adapted to allow at least two different trajectories to be selected. The system or software or means may be adapted to allow at least two different perceptual linearity metrics are used corresponding to the at least two selected trajectories. The system or software or means may be adapted to allow one selected trajectory to correspond to the neutral grey scale and wherein perceptual linearity for the neutral grey scale is evaluated by means of DICOM GSDF. The system or software or means may be adapted so that the transformation furthermore takes into account characteristics of the display system. The system or software or means may be adapted so that the transformation preserves respectively at least 95%, at least 90%, at least 80%, at least 70% of colour gamut and/or luminance and/or contrast. The system or software or means may be adapted so that the transformation is applied by a CPU, a GPU, a DSP, an FPGA or an ASIC. The system or software or means may be adapted so that the transformation is partially applied on a CPU and partially applied on a GPU or an FPGA. The system or software or means may be adapted so that the transformation leaves points not part of the trajectory with their native display calibration. The system or software or means may be adapted so that the transformation adapts points not part of the trajectory such that an increased continuous behaviour is obtained. The system or software or means may be adapted so that the transformation adapts points not part of the trajectory such that they comply with another standard such as gamma or sRGB or for example DICOM GSDF, . . . . The system or software or means may be adapted so that the at least one selected colour scale is the colour scale that maximizes the calculated number of Just Noticeable Differences when this is calculated for a set of colour scales along the same trajectory. The system or software or means may be adapted so that at least one selected trajectory has a higher dimensionality. The system or software or means may be adapted so that each dimension of the trajectory corresponds to a different quantitative value.

The system or software or means may be adapted so that each dimension of the trajectory corresponds to a concentration of a different tracer, or a staining response, or a concentration of a different molecule, or a concentration of a different anti-gen, or a concentration of a different antibody.

The system as described above can be implemented as a controller, e.g. a separate standalone device which is for use with a display or a display system.

The system as described above can be implemented as a processor for use with a display or a display system and which is adapted to carry out any of the methods of the present invention.

The invention claimed is:

1. A method for processing an image, comprising the steps of
calibrating a display device for quantitative imaging, said display device having a colour gamut,
selecting at least one trajectory in a colour space, wherein there are colour points of the display device's colour gamut not in the at least one trajectory but which are used to visualize a part of the image,
defining a transformation which primarily increases perceptual linearity of consecutive points belonging to the at least one trajectory while most of the colour points of the colour gamut not in the at least one trajectory remain unchanged such that at least 70% of the colour gamut, a contrast and a luminance of the display device are preserved,
applying the transformation to the image.

2. The method according to claim 1, wherein the colour space is one of sRGB, aRGB, raw RGB, Lab, or ICC PCS.

3. The method according to claim 1, wherein at least one trajectory is selected from:
containing points having a different colour point,
containing only points of a primary colour or a secondary colour,
corresponding to the colour space or a colour scale,
maximizing the number of just noticeable differences along the at least one trajectory,
being piecewise linear in the colour space or scale,
being non-linear in the colour space or scale,
being based on characteristics or type of typical images that will be shown on a display system,
being based on a reference image or calibration image,
individually selected for each image, and
being based on a type of image or characteristics of the image.

4. The method according to claim 3, wherein the colour space or scale is the colour space or scale that maximizes a calculated number of Just Noticeable Differences when the calculated number of the Just Noticeable Differences is calculated for a set of colour spaces or scales along a same trajectory.

5. The method according to claim 1, wherein the at least one trajectory contains colours corresponding to different levels of a quantitative value, and wherein the colours are ordered along the at least one trajectory based on ascending or descending value of the quantitative value.

6. The method according to claim 5, wherein the quantitative value is selected from one of concentration of a molecule, staining response, concentration of a tracer, concentration of a substance, concentration of a target molecule, molecular activity, metabolic activity, stiffness of a material, strength of a material, characteristics of a material, a biomarker value.

7. The method according to claim 1, wherein the image is selected from:
a digital pathology image and the or an at least one trajectory is selected based on a particular stain that is used in the digital pathology image or a specific subspecialty of the digital pathology image, and
a digital pathology image and the or an at least one trajectory is based on colour values that correspond to staining response for different concentrations of an antigen, and
a medical image and the or an at least one trajectory is based on colour values that correspond to different gradations of response to a contrast medium or a tracer.

8. The method according to claim 1, wherein perceptual linearity is quantified by one of CIE76, CIE94, CIEdeltaE2000, and DICOM GSDF.

9. The method according to claim 1, wherein at least two different trajectories are selected.

10. The method according to claim 9, wherein at least two different perceptual linearity metrics are used corresponding to the at least two selected trajectories.

11. The method according to claim 10, wherein one selected trajectory corresponds to a neutral grey scale and wherein perceptual linearity for the neutral grey scale is evaluated by means of DICOM GSDF.

12. The method according to claim 1, wherein the transformation furthermore takes into account characteristics of a display system.

13. The method according to claim 1, wherein defining the transformation preserves respectively at least 95%, at least 90%, at least 80%, of colour gamut and/or luminance and/or contrast.

14. The method according to claim 1, wherein applying the transformation is selected from:
applied on a CPU, a GPU, a DSP, an FPGA or an ASIC, and
partially applied on a CPU and partially applied on a GPU or an FPGA.

15. The method according to claim 1, wherein the transformation leaves at least some points not part of the at least one trajectory with tei ar native display behaviour of the at least some points or with a desired calibrated behaviour.

16. The method according to claim 1, wherein the transformation is selected from adapting points not part of the at least one trajectory such that an increased continuous behaviour is obtained, and interpolating between points of the at least one trajectory, and other points that have been fixed.

17. The method according to claim 16, wherein other points that have been fixed include points on an outer boundary of the colour gamut or points belonging to primary or secondary colours.

18. The method according to claim 1, wherein the transformation adapts at least some points not part of the at least one trajectory such that the at least some points comply with another standard such as gamma, aRGB or sRGB.

19. The method according to claim 1, wherein the or an at least one selected trajectory has higher dimensionality which dimensionality corresponds to at most the maximum dimension of the colour space.

20. The method according to claim 19, wherein each dimension of the trajectory is selected from:
    corresponding to a different quantitative value, and
    corresponding to a concentration of a different tracer, or a staining response, or a concentration of a different molecule, or a concentration of a different anti-gen, or a concentration of a different antibody.

21. The method according to claim 19, wherein a first dimension corresponds to a degree of reaction to Hematoxylin and a second dimension corresponds to a degree of reaction to Eosin.

22. A display device for displaying an image, adapted to carry out the method according to claim 1.

23. A controller for use with a display, the controller comprising a program on non-transitory computer-readable medium, which when executed by a processor, is adapted to carry out the method according to claim 1.

24. A computer program product on non-transitory computer-readable medium which when executed on a processing engine carries out the method according to claim 1.

25. A system including a display vice and a visualization application adapted to carry out the method according to claim 1.

26. The system of claim 25, comprising a processing engine.

27. The system of claim 26, wherein the processing engine includes one or more central processors CPU or one or more GPU, or one or more DSP, or one or more FPGA or one or more ASIC and an input and an output and memory.

28. The system of claim 27, wherein the processing engine is a standalone unit or is embedded.

* * * * *